United States Patent [19]
Shiraishi

[11] 3,737,130
[45] June 5, 1973

[54] HYDRAULICALLY OPERATED TRIPOD HEAD

[75] Inventor: Yukinobu Shiraishi, Tokyo, Japan

[73] Assignee: Slick Tripod Co., Ltd., Saitama-ken, Japan

[22] Filed: Oct. 7, 1970

[21] Appl. No.: 78,895

[30] Foreign Application Priority Data

June 25, 1970 Japan .............................45/73958
June 25, 1970 Japan .............................45/73959

[52] U.S. Cl. .............................................248/181
[51] Int. Cl. ...........................................F16m 11/04
[58] Field of Search ....................248/181; 269/75

[56] References Cited

UNITED STATES PATENTS

2,354,937  9/1944  Barker..............................269/75 X

FOREIGN PATENTS OR APPLICATIONS

472,713  4/1951  Canada................................269/75

*Primary Examiner*—William H. Schultz
*Attorney*—Flynn & Frishauf

[57] ABSTRACT

A tripod head comprises a head body and a hydraulic mechanism with a plurality of interconnected cylinders which normally fixes the head body to the support and, when operated, permits the same to be turned to any desired position with respect to the support. The tripod head is further provided on the head body with a fixing attachment for mounting a camera or the like in any desired lengthwise position on the head body.

7 Claims, 6 Drawing Figures

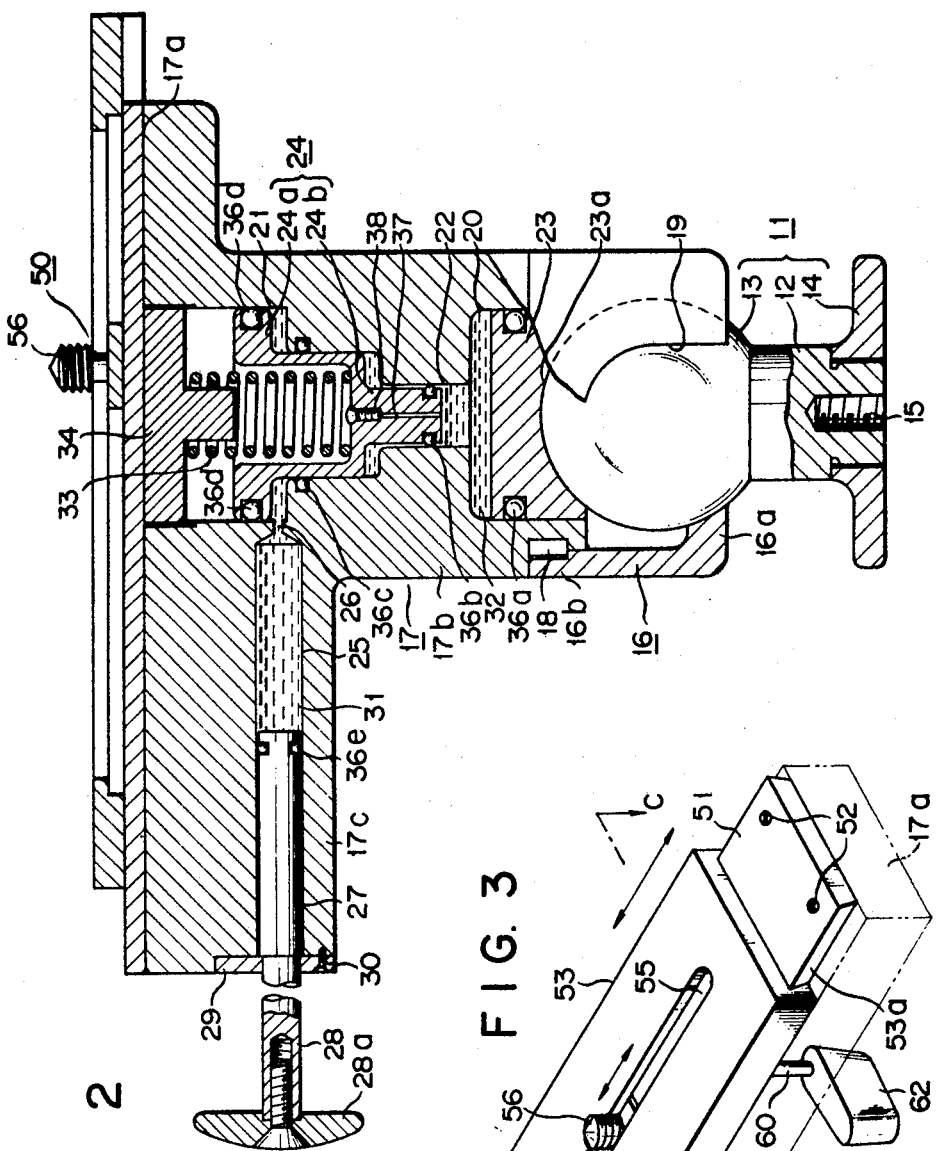

HYDRAULICALLY OPERATED TRIPOD HEAD

The present invention relates a tripod head for turning a camera mounted thereon to any desired position.

A conventional tripod head has been so designed as to be turned to a desired position by loosening a pan rod and to be held in said desired position by tightening the rod. However, such loosening and tightening operations are time comsuming. Tightening of the rod causes the tripod head to deviate from the required position. Moreover, the amount of the tightening force varies with the force applied by the user.

Further, a set screw of a camera for connecting the camera to a tripod head is not always located at that part of the bottom surface of the camera where the axis of said screw intersects the optical axis of the camera. Moreover, the position of the set screw usually varies with each camera. In photography, particularly taking panoramic pictures by using the tripod head, it is necessary to make the optical axis of a camera intersect the rotation axis of the tripod head. To this end, the head must be so designed as to allow the camera to move in longitudinal directions. However, a conventional tripod head does not permit such adjustment.

A tripod head according to the present invention comprises a support attachable to a tripod, a head body substantially forming the main body of said tripod head to be fixed to the support by a hydraulic mechanism provided in said head body when said mechanism is in an inoperative state and to be disengaged from said support by said hydraulic mechanism so as to be freely rotatable with respect to said support when said mechanism is in an operative state, and a camera fixing attachment located on the head body to mount the camera on said head body. The tripod head according to this invention enables the head body to be normally fixed to the support under a predetermined per se.

An object of the present invention is to provide a tripod head so arranged that a head body may be turned to any desired position and then quickly fixed to a support to be accurately held in said position or freed from the support a hydraulic pressure.

Another object of this invention is to provide a tripod head having an attachment for fixing a camera to the head with the optical axis of the camera so arranged as to intersect the rotation axis of the head.

Still another object of this invention is to provide a tripod head fixing a sliding body having an attachment for quickly and accurately fixing a camera to the head.

The present invention can be more fully understood from the following detailed description when taken in connection with the accompanying drawings, in which:

FIG. 2 is a cross-sectional view taken along the line A—A of FIG. 1;

FIG. 3 is a perspective view of a camera fixing attachment used in the tripod head according to the present invention;

Figure 1:
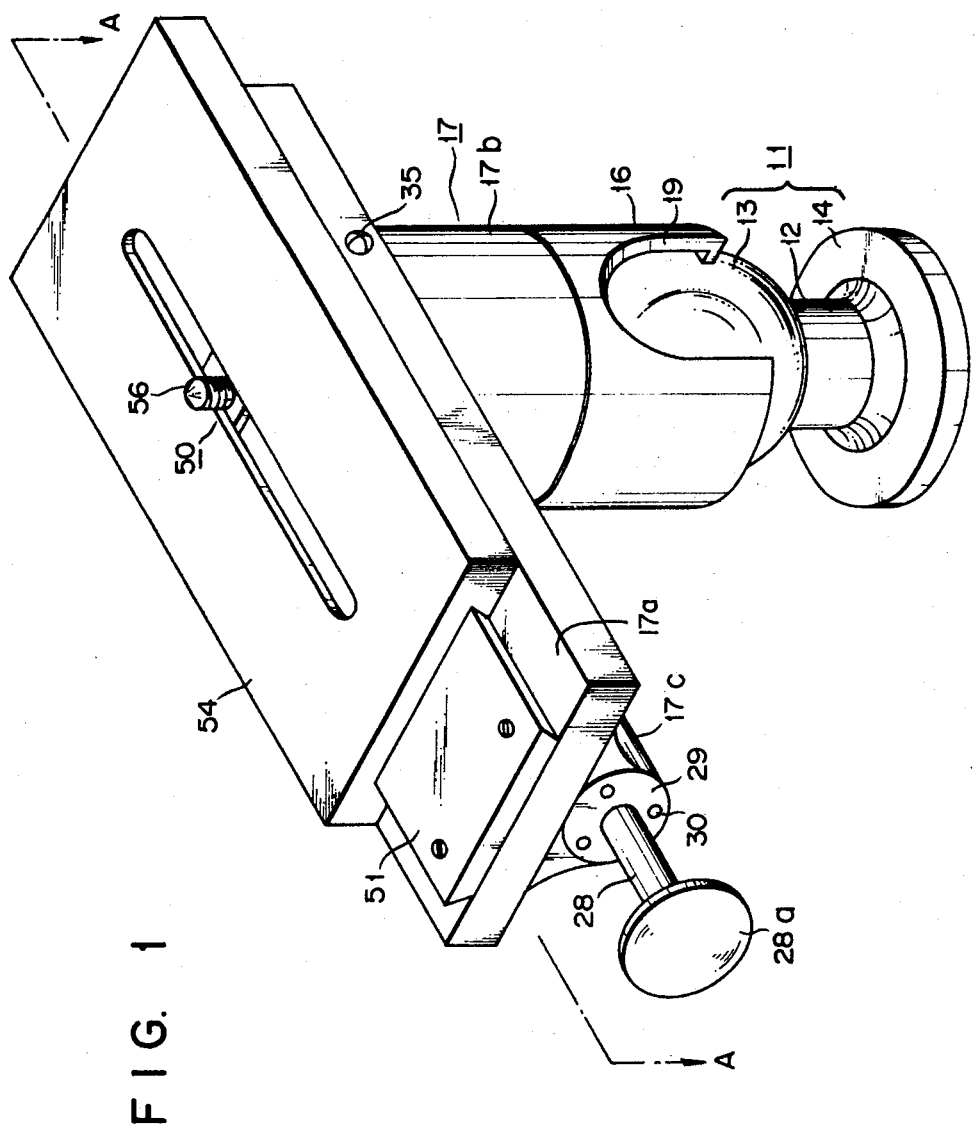
FIG. 1 is a perspective view of a tripod head according to the present invention.

Referring to FIGS. 1 and 2, a support 11 comprises a ball 13 connected to a neck 12 which is securely mounted on a base 14 by means of screws or the like. The support 11 is detachably mounted on a tripod (not shown) by means of a threaded hole 15 which is formed in the central portion of the bottom surface of the base plate 14.

A substantially cylindrical socket 16 is provided at its lower end with an inwardly extending flange 16a the inner surface of which contacts the ball 13, in a manner to enclose the ball 13. Into the upper end 16b of the socket 16 is inserted the lower end of a head body 17 with a ring 18 interposed therebetween.

The diameter of a lower circular opening defined by the flange 16a of the socket 16 is made larger than that of the neck 12, so the ball 13 can be housed in the socket 16 through an opening defined by the upper end 16b of the socket 16 with the neck 12 projected through the lower opening before the neck 12 is mounted on the base plate 14.

A slot 19 is formed in the lower peripheral wall of the socket 16. When hydraulic pressure to be described later does not act on the ball 13, the head body 17 can be turned up to the position nearly perpendicular to the axis of the neck 12 from its vertical position by fitting the neck 12 of the ball 13 into the slot 19, and also can be rotated coaxially with the socket 16, with the result that the head body 17 can assume any desired position with respect to the base 11. Thus, a camera (not shown) mounted on a camera fixing attachment 50 on the upper surface 17a of the head body 17 can be turned to any desired position.

There will now be described a hydraulic mechanism. As shown in FIG. 2, the upper and lower end portions of the stem 17b of the head body 17 are respectively provided with a first cylinder 21 and a main cylinder 20. Between the cylinders 20 and 21 is disposed a second cylinder 22 having a smaller diameter for mutual communication. Into the main cylinder 20 is slidably inserted a ball rest member 23 with a concave spherical surface 23a contacting the ball 13. Into the first cylinder 21 and the second cylinder 22 are respectively fitted a first piston 24a and a second piston 24b which are made integral to form a piston block generally designated by 24.

The head body 17 is provided with an arm 17c which projects laterally from the upper portion of the stem 17b. In the arm 17c is formed a third cylinder 25 which communicates with the first cylinder 21 through an orifice 26. As shown in FIG. 2, a plunger 27 is slidably held in the third cylinder 25. To the end of the plunger 27 which is remote from the stem 17b is connected a rod 28 protruding from the end of the arm 17c of the head body 17 through a stop plate 29 fixed thereto by screws 30. To the outwardly projecting end of the plate rod 28 is secured a knob 28a. The stop plate 29 is adapted to be contacted with the end of the plunger 27 when it remains in an operative state, thereby preventing the plunger 27 from coming off the third cylinder 25. Fluid 31 such as oil is filled in the third cylinder 25 and the first cylinder 21 under the first piston 24a so that the first piston 24a is lifted from the lower end of the first cylinder 21 to such an extent to cause the first cylinder 25 to communicate with the first cylinder 21 under the first piston 24a even when the plunger 27 is in the inoperative state.

Further, fluid 32 (oil, for instance) is filled in the second cylinder 22 and the main cylinder 20. A cover 34 is inserted into the upper end of the first cylinder 21 so as to be flush with upper surface 17a of the head body 17.

A compression spring 33 or the like is placed between the cover 34 and the piston block 24 to urge the latter downward. A pin 35 (FIG. 1) serves to prevent the cover 34 from rotating and coming of the first cylinder 21. Numerals 36a, 36b, 36c, 36d, and 36e are O - rings for preventing the leakage of the fluids.

In the piston block 24 is formed an air passage 37 through which theair in the second cylinder 22 is removed when the piston block 24 is inserted into the first and second cylinders 21 and 22 and which is hermetically sealed by means of a screw 38 after the insertion.

Numeral 50 is a camera fixing attachment which will be explained later in detail.

The operation of the tripod head will be explained as follows. When the rod 28 is in the inoperative state as shown in FIG. 2, the piston block 24 is placed in its lowest position by the action of the compression spring 33 and part of the fluid 32 in the second cylinder 22 is forced into the main cylinder 32 to lower the ball rest member 33 so that the 13 is clamped between the concave surface 23a of the member 23 and the flange 16a of the socket 16. Thus, the head body 17 is firmly connected to the base 11.

When the operating piston 27 is moved to the right as viewed in FIG. 2 by pushing the knob 28a, part of the fluid 31 in the third cylinder 25 flows through the orifice 26 into the first cylinder 21 to lift the cylinder block 24 against the force of the compression spring 33, whereupon part of the fluid 32 in the main cylinder 20 is conducted into the second cylinder 22 to reduce the fluid pressure in the main cylinder 20. Therefore, the ball rest member 23 is no longer subject to the action of the spring 33 and the pressures between the ball rest members 23 and the ball 13 and between the ball 13 and the socket 16 vanish. As a result, the head body 17 can be rotated coaxially with the socket 16 and can be placed in any desired position with respect to the support 11. Thus, a camera (not shown) mounted on the camera fixing attachment 50 can be turned to any desired position.

When the knob 28a is released after the direction of the optical axis and the inclination of the camera have been selected, part of the fluid 31 in the first piston 24a flows in the third cylinder 25 through orifice 26 to push back the plunger 27 to the inoperative position and lower the ball rest member 23 so as to make the head body 17 immovable with respect to the support 11. As the ball 13 is clamped between the ball rest member 23 and the flange 16a of the socket 16 at a constant pressure, the camera can be set accurately and quickly at any desired position.

Figure 4:
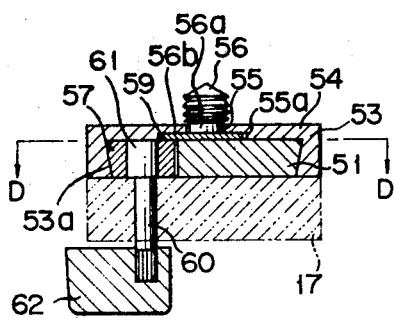
FIG. 4 is a cross-sectional view taken along the line C — C of FIG. 3.
Figure 6:
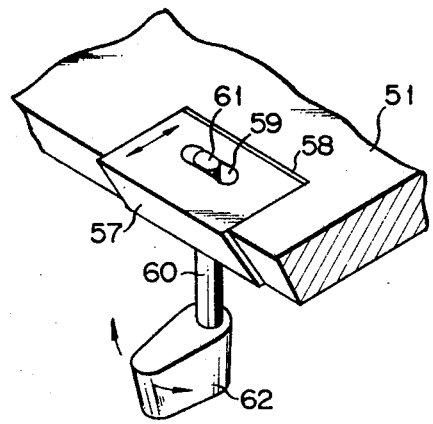
FIG. 6 shows a perspective view, partly broken, of the camera fixing attachment shown in FIG. 3.

FIGS. 3 to 6 show an embodiment of the camera fixing FIGS. 50 according to this invention. Referring to FIGS. 3, 4 and 6, a guide plate having a trapezoidal cross section is secured to the upper surface 17a of the head body 17 by means of screws 52. As shown in FIG. 4, a sliding member 53 has a dovetail groove 53a which engages the guide plate 51 so that the member 53 can slide lengthwise of the guide plate 51. A slit 55 is formed lengthwise in the upper wall 54 of the sliding member 53. In the upper wall 54 under the slit 55 is formed another groove 55a into which is fitted a slider 56b. A fixing screw 56 is provided at one end with a neck portion 56a having a diameter smaller than the width of the slit 55. The neck portion 56a has the free end connected to the slider 56b in the groove 55a so that the threaded portion of the screw 56 protrudes outwardly through the slit 55. Accordingly, the screw 56 can travel along the slit 55 without coming off it so that the screw 56 is placed in any desired lengthwise position on the camera fixing attachment 50. When the fixing screw 56 is threaded into the female screw of a camera, the camera and the slider 56b tighten the upper wall 54 of the sliding member 53, whereby the camera can be attached to the camera fixing attachment 50. A clamping member 57 having a trapezoidal cross section as shown in FIG. 4 is fitted into a recess 58 formed in a lateral side of the guide plate 51 and is adapted to mvoe transversely thereof.

Figure 5:
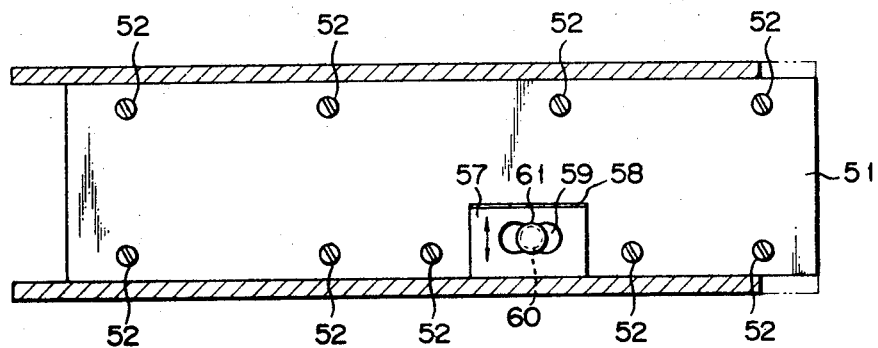
FIG. 5 is a cross-sectional view taken along the line D — D of FIG. 4.

As shown in FIGS. 4 to 6, an elongate through hole 59 is formed in the clamping member 57. Mounted in the hole 59 is a cam 61 eccentrically connected to the upper end of shaft 60 which passes vertically through the head body 17. To the lower end of the shaft 60 is connected a lever 62.

When the lever 62 is rotated to turn the shaft 60 as viewed in FIGS. 3 and 6 thereby to rotate the cam 61 the clamping member 57 is moved transversely of the guide plate 51 in the recess 58 to an extent within the amount of the eccentricity of the cam 61. The clamping member 57, when it projects toward the sliding member 53, frictionally contacts under pressure with the surface of the groove 53a which faces the member 57. Thus, the sliding member 53 is firmly connected to the head body 17. When the clamping member 57 is retracted, the sliding member 53 can freely slide on the guide plate 51. These operations of the clamping member 57 can be performed quickly and accurately by rotating the shaft 60 by less than a quarter turn.

A combination of the camera fixing attachment of FIGS. 3 and 6 and the tripod head of FIGS. 1 and 2 enables a camera to be set not only in an arbitrary direction but also mounted in the optimum position on the head body 17.

I claim:

1. A tripod head including:
   a head body comprising a stem and an arm projecting laterally from said stem;
   a socket, one end of which is rotatably connected to one end of said stem and other end of which is provided with an inwardly extending flange;
   a support means comprising a ball disposed in said socket so as to make a ball-socket joint with said flange, and a neck connected at one end to said ball;
   a slot formed in the lateral side of said socket for receiving said neck when said head body is turned vertically with respect to said support;
   a hydraulic mechanism comprising a main cylinder provided in said one end of the stem, a ball rest member slidably inserted in said main cylinder and having a concave surface engageable with said ball, a first cylinder provided in the other end of the stem, a second cylinder located between said main and first cylinders and having a diameter smaller than those of said main and first cylinders, said second cylinder communicating with said main and first cylinders, a piston block comprised of a first piston inserted into said first cylinder and a second piston inserted into said second cylinder, urging means for biasing said piston block toward said main cylinder to cause fluid filled in said main and second cylinders to normally press said ball rest member against said ball for firmly fixing said head body to said head support, a third cylinder formed in said arm of said head body and communicating with a space within said first cylinder adjacent to said second cylinder, and a plunger inserted into said third cylinder to move, when said plunger is forced into said third cylinder, said piston block against the biasing force of said urging means to permit movement of said head body relative to said support; and a fixing attachment mounted on said head body for fixing a load body to said tripod head.

2. The tripod head according to claim 1 wherein said hydraulic mechanism further comprises a rod having one end connected to the end of said plunger remote from said head body and a knob connected to the other end of said rod.

3. The tripod head according to claim 1 wherein said urging means comrpises a cover fitted into that end of the first cylinder which is remote from the second cylinder, and a compression spring disposed between said cover and said piston block to bias said piston block toward said main cylinder.

4. The tripod head according to claim 1 wherein said ball rest member is sealably slideable in said main cylinder and constitutes the piston of said main cylinder.

5. The tripod head according to claim 1 wherein said fixing attachment is a camera fixing attachment and comprises a guide plate fixed to said head body, a sliding member in dovetail engagement with said guide plate, a clamping means disposed between said guide plate and said sliding member for firmly connecting said sliding member with said guide plate, and an adjusting means slidably mounted in said sliding member for setting a camera in any desired lengthwise position on said sliding member.

6. The tripod head according to claim 5 wherein said clamping means comprises a clamping member inserted into a recess formed in a lateral side of said guide plate, an elongated through hole formed in said clamping member and extending lengthwise of said guide plate, a cam mounted in said hole, a shaft rotatably mounted in said head body and eccentrically connected at one end to said cam, and a lever connected to the other end of said shaft for rotating said shaft.

7. The tripod head according to claim 5 wherein said adjusting means comprises a slider movable in a groove formed lengthwise in said sliding member and a fixing screw for mounting a camera on the camera fixing attachment, said screw having one end connected to said slider and the other end extending outwardly through a lengthwise extending slit formed in said sliding member.

* * * * *